(12) United States Patent
Liu et al.

(10) Patent No.: US 11,082,176 B2
(45) Date of Patent: Aug. 3, 2021

(54) SYSTEM AND METHOD FOR TRANSMITTING A SUB-SPACE SELECTION

(71) Applicant: FutureWei Technologies, Inc., Plano, TX (US)

(72) Inventors: Bin Liu, San Diego, CA (US); Pengfei Xia, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/800,955

(22) Filed: Nov. 1, 2017

(65) Prior Publication Data

US 2018/0131486 A1 May 10, 2018

Related U.S. Application Data

(60) Provisional application No. 62/417,832, filed on Nov. 4, 2016.

(51) Int. Cl.
| | |
|---|---|
| *H04L 5/00* | (2006.01) |
| *H04W 72/04* | (2009.01) |
| *H04B 7/06* | (2006.01) |
| *H04L 25/02* | (2006.01) |

(52) U.S. Cl.
CPC .......... *H04L 5/0048* (2013.01); *H04B 7/063* (2013.01); *H04B 7/066* (2013.01); *H04B 7/0639* (2013.01); *H04B 7/0695* (2013.01); *H04L 5/0057* (2013.01); *H04W 72/046* (2013.01); *H04L 25/0226* (2013.01)

(58) Field of Classification Search
CPC .................... H04W 15/0048; H04B 7/0695
See application file for complete search history.

(56) References Cited

U.S. PATENT DOCUMENTS

| | | | |
|---|---|---|---|
| 8,254,487 B2 | 8/2012 | Tsai et al. | |
| 8,743,985 B2 | 6/2014 | Li et al. | |
| 9,357,434 B2 | 5/2016 | Ko et al. | |
| 2007/0124460 A1 | 5/2007 | McMullen et al. | |
| 2008/0062039 A1 | 3/2008 | Cohen et al. | |
| 2008/0084843 A1 | 4/2008 | Gorokhov et al. | |
| 2011/0007685 A1* | 1/2011 | Ma ........................ | H01Q 25/00 370/315 |

(Continued)

FOREIGN PATENT DOCUMENTS

| | | |
|---|---|---|
| CN | 102308492 A | 1/2012 |
| CN | 102801455 A | 11/2012 |

(Continued)

OTHER PUBLICATIONS

Ericsson; "Phase and amplitude vs. phase only beam combining for advanced CSI reporting"; 3GPP TSG-RAN WG1 #86bis; 7.2.2.1.1; R1-1609855; Lisbon, Portugal, Oct. 10-14, 2016; 6 pages.

(Continued)

*Primary Examiner* — Muthuswamy G Manoharan
(74) *Attorney, Agent, or Firm* — Slater Matsil, LLP

(57) ABSTRACT

Embodiments of this disclosure provide techniques for receiving reference signals by a user equipment (UE) from a base station in a downlink channel, as well as transmitting a linear combination index from the UE to the base station. In particular, the linear combination index identifies a combination of beams selected from a set of beams in accordance with the RS.

31 Claims, 4 Drawing Sheets

(56) References Cited

U.S. PATENT DOCUMENTS

| | | |
|---|---|---|
| 2011/0087888 A1 | 4/2011 | Rennie |
| 2013/0235742 A1* | 9/2013 | Josiam .................. H04W 24/10 370/252 |
| 2014/0269968 A1 | 9/2014 | Li et al. |
| 2014/0355702 A1* | 12/2014 | Thomas ................ H04L 5/0032 375/267 |
| 2015/0171945 A1 | 6/2015 | Liu et al. |
| 2016/0006494 A1* | 1/2016 | Yang .................. H04L 25/0391 370/329 |
| 2016/0119045 A1* | 4/2016 | Rahman ............... H04B 7/0617 375/267 |
| 2016/0142117 A1* | 5/2016 | Rahman ............... H04B 7/0469 375/267 |
| 2016/0323022 A1* | 11/2016 | Rahman ............... H04B 7/0469 |
| 2016/0381569 A1 | 12/2016 | Wang et al. |
| 2017/0026102 A1 | 1/2017 | Guo et al. |
| 2017/0048863 A1* | 2/2017 | Tsai ..................... H04B 7/0456 |
| 2017/0230095 A1 | 8/2017 | Kim et al. |
| 2017/0237477 A1* | 8/2017 | Fujio ....................... H04B 7/06 370/329 |
| 2017/0302341 A1* | 10/2017 | Yu ......................... H04B 7/0639 |
| 2018/0131486 A1 | 5/2018 | Liu et al. |
| 2018/0198569 A1* | 7/2018 | Lyu ...................... H04B 7/0626 |
| 2019/0045494 A1* | 2/2019 | Ho ....................... H04W 72/046 |
| 2019/0174477 A1* | 6/2019 | Chai ..................... H04W 72/04 |

FOREIGN PATENT DOCUMENTS

| | | |
|---|---|---|
| CN | 104396152 A | 3/2015 |
| CN | 104734761 A | 6/2015 |
| CN | 104917559 A | 9/2015 |
| CN | 105103261 A | 11/2015 |
| CN | 105324944 A | 2/2016 |
| CN | 105530075 A | 4/2016 |
| CN | 104937971 B | 5/2019 |
| CN | 110324072 B | 9/2020 |
| EP | 2775563 A1 | 10/2014 |
| RU | 2419804 C2 | 5/2011 |
| RU | 2420884 C2 | 6/2011 |
| WO | 9512262 A1 | 5/1995 |
| WO | 2007124460 A1 | 11/2007 |
| WO | 2009075662 A1 | 6/2009 |
| WO | 2011106457 A2 | 9/2011 |
| WO | 2013040089 A2 | 3/2013 |
| WO | 2013169195 A1 | 11/2013 |
| WO | 2014022032 A1 | 2/2014 |
| WO | 201416337 A1 | 10/2014 |
| WO | 2015199588 A1 | 12/2015 |
| WO | 2016080743 A1 | 5/2016 |
| WO | 2016164048 A1 | 10/2016 |

OTHER PUBLICATIONS

Samsung; "Linear combination W1 codebook"; 7.2.2.1.1; 3GPP TSG RAN WG1 Meeting #86b; R1-1609012; Lisbon, Portugal Oct. 10-14, 2016; 7 pages.

NTT DOCOMO., "Codebook Enhancement for eFD-MIMO", 3GPP TSG RAN WG1 Meeting #86, R1-167348, Aug. 22-26, 2016, 4 pages, Gotheburg, Sweden.

ZTE Corporation et al., "Discussion on CSI reporting of linear combination codebook", 3GPP TSG RAN WG1 Meeting #85, R1-165444, May 23-27, 2016, 6 Pages, Nanjing, China.

ZTE Corporation et al., "Discussion on the design of linear combination codebook", 3GPP TSG RAN WG1 Meeting #86, R1-166322, Aug. 22-26, 2016, 10 Pages, Gothenburg, Sweden.

Samsung, "Linear combination (LC) codebook based CSI reporting and simulation results", 3GPP TSG RAN WG1 Meeting #85, R1-164780, May 23-27, 2016, 10 Pages, Nanjing, China.

ZTE Corporation et al., "Discussion on methods of determining Tx and Rx beams for NR MIMO," 3GPP TSG RAN WG1 Meeting #86bis, R-1608667, Oct. 10-14, 2016, 7 pages.

Jia et al., "Flexible Selective Active Beam Joint Inter-beam Power and Bandwidth Allocation Algorithm," Feb. 28, 2014, 2 pages, English Abstract only.

Sun et a'., "Beam Division Multiple Access Transmission for Massive MIMO Communications," IEEE Transactions on Communications, vol. 63, No. 6, Jun. 2015, 15 pages.

* cited by examiner

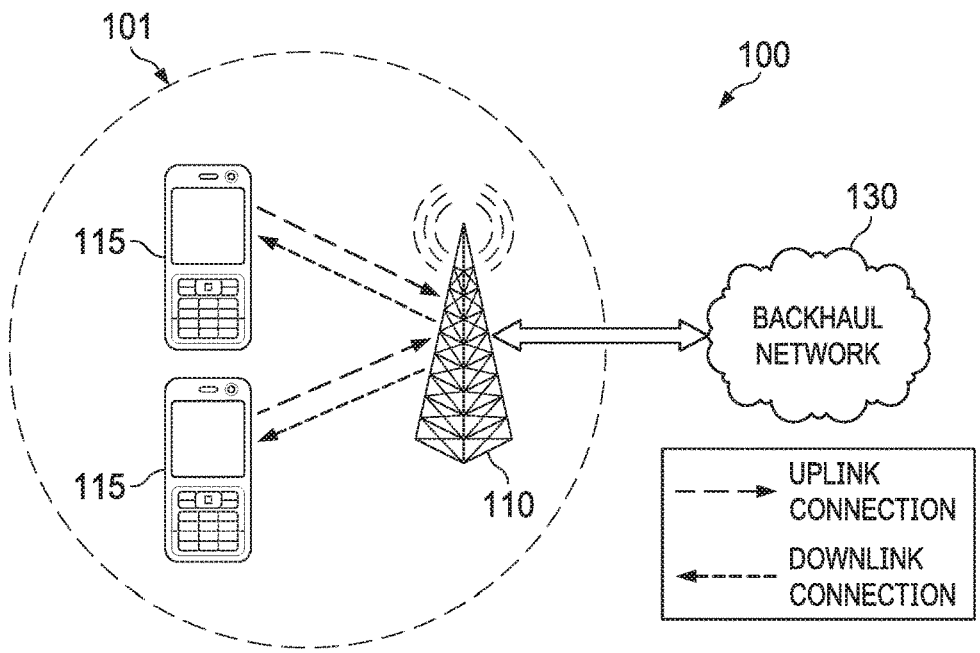
FIG. 1
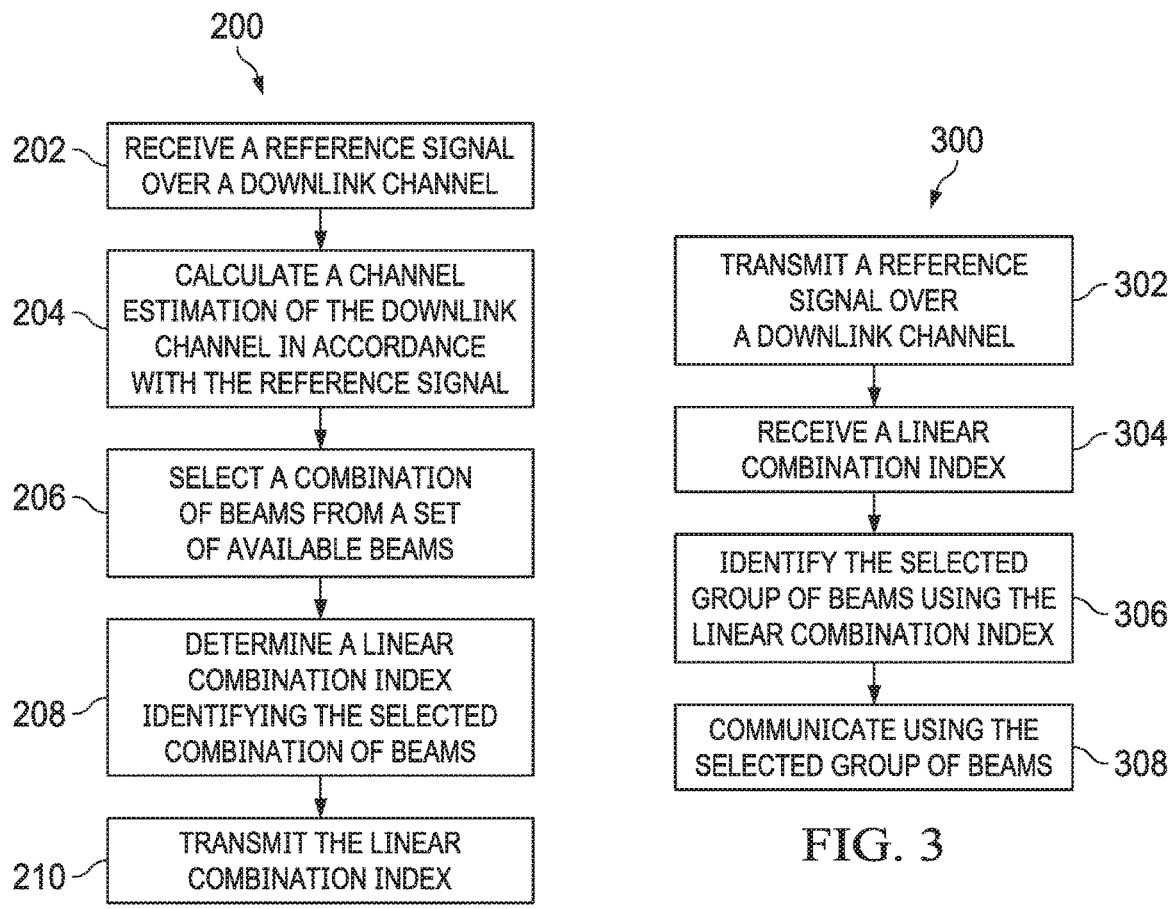
FIG. 2
FIG. 3

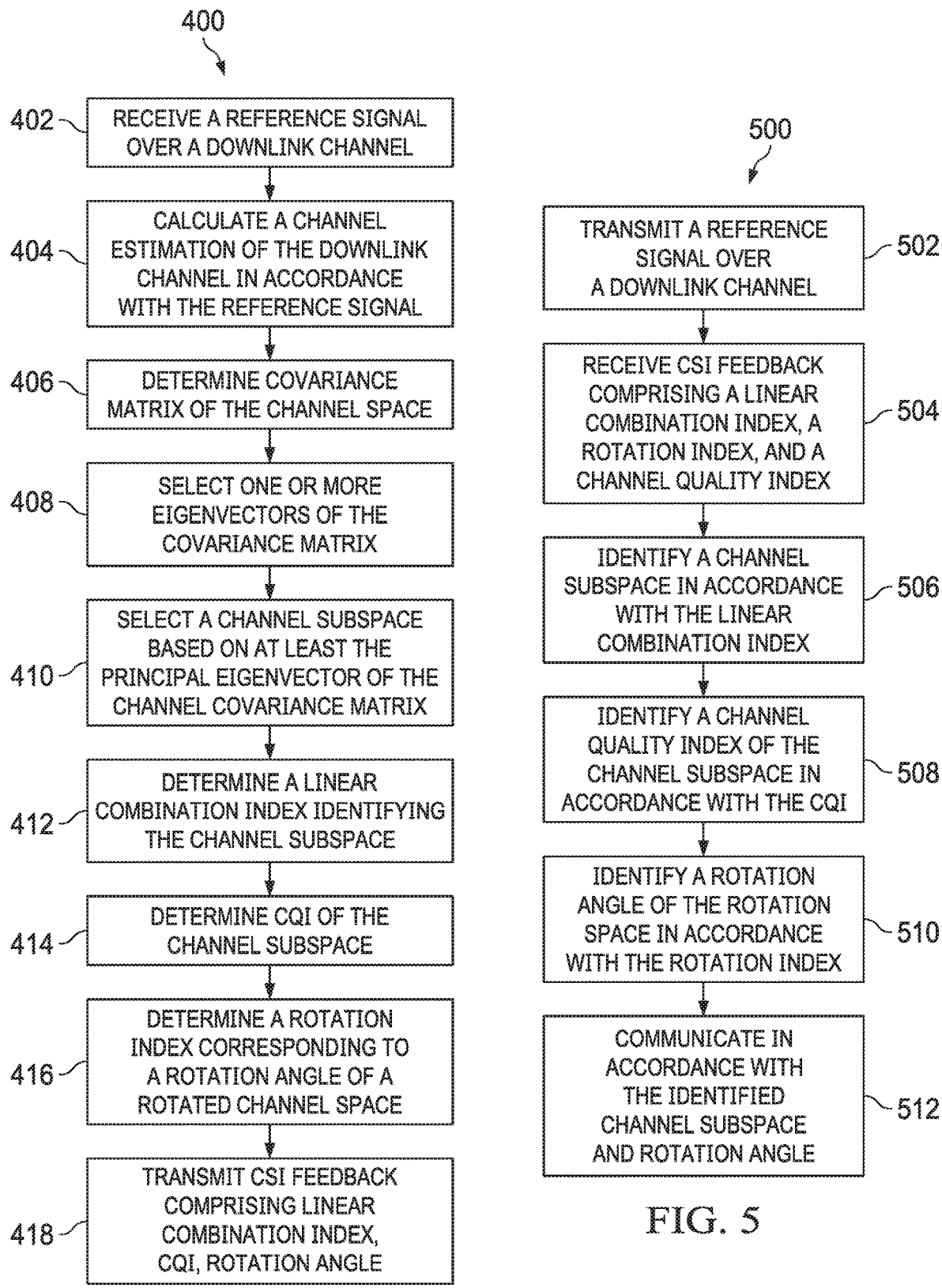

SYSTEM AND METHOD FOR TRANSMITTING A SUB-SPACE SELECTION

CROSS-REFERENCE TO RELATED APPLICATIONS

This application claims the benefit of U.S. Provisional Application No. 62/417,832, filed on Nov. 4, 2016, which application is hereby incorporated herein by reference.

TECHNICAL FIELD

The present disclosure relates generally to a system and method for a subspace selection, and, in particular embodiments, to a system and method for transmitting a subspace selection.

BACKGROUND

Wireless signals communicated at high carrier frequencies, such as millimeter Wave (mmW) signals, tend to exhibit high free-space path loss. To compensate for high path loss rates, next-generation telecommunication networks may utilize beamforming at both the base station and the UE to exploit multipath propagation and increase system throughput and/or reliability. Implementing beamforming at both the base station and the UE may significantly increase the complexity of the underlying beam management techniques.

SUMMARY

Technical advantages are generally achieved by embodiments of this disclosure which describe methods for transmitting a subspace selection.

In accordance with an embodiment, a method for subspace selection is provided. In this embodiment, the method includes receiving a reference signal (RS) by a user equipment (UE) from a base station in a downlink channel, as well as transmitting a linear combination index from the UE to the base station. In this embodiment, the linear combination index identifies a combination of beams selected from a set of beams in accordance with the RS. In one example, the linear combination index identifies the selected combination of beams without identifying, or otherwise explicitly indicating, individual beams within the selected combination of beams. Optionally, in such an example, or in another example, the linear combination index belongs to a set of predefined linear combination indices, and each predefined linear combination index in the set of predefined linear combination indices identifies a different combination of beams in the set of beams. Optionally, in any one of the above mentioned examples, or in another example, the method further includes transmitting a rotation index by the UE to the base station. The rotation index identifies a selected angle of rotation of a channel space comprising the set of beams. The method further includes transmitting a channel quality index (CQI) corresponding to selected weighted combination of beams from the UE to the base station. Optionally, in any one of the above mentioned examples, or in another example, the method further includes calculating a channel estimation of the downlink channel by the UE in accordance with the RS, selecting a rotation index by the UE in accordance with the calculated channel estimation, and transmitting the selected rotation index by the UE to the base station. The combination of beams being selected in accordance with the calculated channel estimation. Optionally, in any one of the above mentioned examples, or in another example, the RS is received over different beams in the set of beams in the downlink channel. Optionally, in any one of the above mentioned examples, or in another example, the RS is received non-precoded in the downlink channel.

In accordance with another embodiment, a method for subspace selection is provided. In this embodiment, the method includes transmitting a RS from a base station to a user equipment (UE) and receiving a linear combination index by the base station from the UE. In this embodiment, the linear combination index identifies a combination of beams, selected by the UE, from a set of beams in accordance with the RS. In one example, the linear combination index identifies the selected combination of beams without identifying individual beams within the selected combination of beams. Optionally, in such an example, or in another example, the linear combination index belongs to a set of predefined linear combination indices, and each predefined linear combination index in the set of predefined linear combination indices identifies a different combination of beams in the set of beams. Optionally, in any one of the above mentioned examples, or in another example, the method further includes receiving a rotation index by the base station from the UE, the rotation index identifying a selected angle of rotation of the set of beams. In this embodiment, the method further includes receiving a channel quality index (CQI) corresponding to selected weighted combination of beams by the base station. Optionally, in any one of the above mentioned examples, or in another example, the RS is transmitted over different beams in the set of beams. Optionally, in any one of the above mentioned examples, or in another example, the RS is received non-precoded in the downlink channel.

In accordance with yet another embodiment, a user equipment is provided that includes a processor and a non-transitory computer-readable medium storing programming for execution by the processor. In this embodiment, the programming includes instructions for receiving a RS from a base station in a downlink channel and transmitting a linear combination index to the base station, the linear combination index identifying a combination of beams selected from a set of beams in accordance with the RS. In one example, the linear combination index identifies the selected combination of beams without identifying, or otherwise explicitly indicating, individual beams within the selected combination of beams. Optionally, in such an example, or in another example, the linear combination index belongs to a set of predefined linear combination indices and each predefined linear combination index in the set of predefined linear combination indices identifies a different combination of beams in the set of beams. Optionally, in any one of the above mentioned examples, or in another example, the programming further includes instructions for transmitting a rotation index to the base station. The rotation index identifies a selected angle of rotation of the set of beams. The programming further includes transmitting a channel quality index (CQI) corresponding to the selected combination of beams. Optionally, in any one of the above mentioned examples, or in another example, the programming further includes instructions for calculating a channel estimation of the downlink channel in accordance with the RS, selecting a rotation index in accordance with the calculated channel estimation, and transmitting the selected rotation index to the base station. The combination of beams being selected is in accordance with the calculated channel estimation. Optionally, in any one of the above mentioned examples, or in another example, the RS is received over different beams in the set of beams in a downlink channel. Optionally, in any one of the above mentioned examples, or in another example, the RS is received non-precoded in the downlink channel.

In accordance with yet another embodiment, a base station is provided that includes a processor and a non-transitory computer-readable medium storing programming for execution by the processor. In this embodiment, the programming includes instructions transmitting a RS to a user equipment (UE) and receiving a linear combination index from the UE. The linear combination index identifies a combination of beams, selected by the UE, from a set of beams in accordance with the RS. In one example, the linear combination index identifies the selected combination of beams without identifying, or otherwise indicating, individual beams within the selected combination of beams. Optionally, in such an example, or in another example, the linear combination index belongs to a set of predefined linear combination indices. Each predefined linear combination index in the set of predefined linear combination indices identifies a different combination of beams in the set of beams. Optionally, in any one of the above mentioned examples, or in another example, the programming further includes instructions for receiving a rotation index from the UE. The rotation index identifies a selected angle of rotation of the set of beams. The programming further includes instructions for receiving a channel quality index (CQI) corresponding to the selected combination of beams. Optionally, in any one of the above mentioned examples, or in another example, the RS is transmitted over different beams in the set of beams. Optionally, in any one of the above mentioned examples, or in another example, the RS is received non-precoded in the downlink channel.

In accordance with yet another embodiment, a method for sending a channel state information is provided that includes selecting, by a user equipment (UE), a first group of beams from a codebook of beams, the first group of beams having a predefined sequence. The method also includes transmitting, by the UE, a first group index to a base station (BS), the first group index uniquely identifying the first group of beams selected from the codebook of beams, a first number of bits representing the first group of beams being equal to ceiling($\log_2(_M^N)$), N being a number of codewords in the codebook of beams and M being a number of beams in the first group of beams. In one example, each beam in the first group of beams is represented by a vector or a matrix. Optionally, in such an example, or in another example, each beam in the codebook of beams is represented by a vector or a matrix. Optionally, in any one of the above mentioned examples, or in another example, the first number of bits is a number of bits before potential encoding. Optionally, in any one of the above mentioned examples, or in another example, a group index is determined by $C_1+l$, where $x_0$, $x_1, \ldots, x_{M-1}$ are M beam indices to be reported, $C_1$ is an arbitrary constant, and l is equal to $$l = \sum_{n=1}^{x_0} \binom{N-n}{M-1} + \sum_{i=0}^{M-3} \sum_{n=x_i+2}^{x_{i+1}} \binom{N-n}{M-2-i} + x_{M-1} - x_{M-2} - 1.$$

Optionally, in any one of the above mentioned examples, or in another example, a group index is determined by $C_2-l$, where $x_0, x_1, \ldots, x_{M-1}$ are M beam indices to be reported, $C_2$ is an arbitrary constant, and l is equal to $$l = \sum_{n=1}^{x_0} \binom{N-n}{M-1} + \sum_{i=0}^{M-3} \sum_{n=x_i+2}^{x_{i+1}} \binom{N-n}{M-2-i} + x_{M-1} - x_{M-2} - 1.$$

Optionally, in any one of the above mentioned examples, or in another example, the predefined sequence is specified in a standard text. Optionally, in any one of the above mentioned examples, or in another example, the method further includes receiving, by the UE, the predefined sequence in a signaling message. Optionally, in any one of the above mentioned examples, or in another example, the predefined sequence is an increasing sequential list of beam indices. Optionally, in any one of the above mentioned examples, or in another example, the predefined sequence is a decreasing sequential list of beam indices. Optionally, in any one of the above mentioned examples, or in another example, the first group of beams being adjacent to a second group of beams in response to the first group index being adjacent to a second group index, the first group of beams being mapped to the first group index, and the second group of beams being mapped to the second group index. Optionally, in any one of the above mentioned examples, or in another example, the first group of beams being adjacent to the second group of beams in response to a last beam index of the first group of beams being adjacent to a last beam index of the second group of beams and each of the other beam indices of the first group of beams being equal to a corresponding one of the other beam indices of the second group of beams. Optionally, in any one of the above mentioned examples, or in another example, the first group index being adjacent to the second group index in response to the first group index being in sequentially before or after the second group index. Optionally, in any one of the above mentioned examples, or in another example, a last beam index of the first group of beams being adjacent to a last beam index of the second group of beams in response to the last beam index of the first group of beams having an index greater or less than one of the last beam index of the second group of beams. Optionally, in any one of the above mentioned examples, or in another example, the first group of beams being greater than a second group of beams in response to the first group index being greater than a second group index, the first group of beams being mapped to a first group index, and the second group of beams being mapped to a second group index. Optionally, in any one of the above mentioned examples, or in another example, the second group of beams being greater than the first group of beams in response to an N-ary representation of the second group index having M beam indices being greater than the N-ary representation of the first group index, the N-ary representation being equal to $x_1 \times N^{(M-1)} + x_{(2)} \times N^{(M-2)} + \ldots + x_{(M-1)} \times N^{(1)} + x_{(M)} \times N^{(0)}$, and $x_y$, being a beam index corresponding to a yth beam index. Optionally, in any one of the above mentioned examples, or in another example, the first group of beams and the second group of beams are one of the group of beams. Optionally, in any one of the above mentioned examples, or in another example, the first group of beams being less than a second group of beams in response to a second group index being greater than the first group index, the first group of beams being mapped to a first group index, and the second group of beams being mapped to the second group index. Optionally, in any one of the above mentioned examples, or in another example, the second group of beams being less than the first group of beams in response to an N-ary representation of the second group index having M beam indices being less than the N-ary representation of the first group index, the N-ary representation being equal to $x_1 \times N^{(M-1)} + x_{(2)} \times N^{(M-2)} + \ldots + x_{(M-1)} \times N^{(1)} + x_{(M)} \times N^{(0)}$ $x_y$ being a beam index corresponding to a yth beam index. Optionally, in any one of the above mentioned examples, or in another example, the first group of beams and the second group of beams are one of the group of beams. Optionally, in any one of the above mentioned examples, or in another example, the method further includes transmitting, by the UE, a rotation index to the base station, the rotation index identifying a selected angle of rotation of a channel space comprising a set of beams in a group of beams. In this embodiment, the method further includes transmitting, by the UE, a channel quality index (CQI) corresponding to selected weighted combination of beams. Optionally, in any one of the above mentioned examples, or in another example, the method further includes calculating, by the UE, a channel estimation of a downlink channel in accordance with a reference signal (RS), a combination of beams selected in accordance with the channel estimation; selecting, by the UE, a rotation index in accordance with the channel estimation; and transmitting, by the UE, the selected rotation index to the base station.

In accordance with yet another embodiment, a method for receiving channel state information is provided that includes receiving, by an access node, a first group index from a user equipment (UE), the first group index uniquely identifying a first group of beams selected from a codebook of beams, a first number of bits representing the first group of beams being equal to ceiling($\log_2({}_M C^N)$), N being a number of codewords in the codebook of beams and M being a number of beams in the first group of beams; and mapping, by the access node, the received first group index to the first group of beams selected from the codebook of beams, the first group of beams having a predefined sequence. In one example, each beam in the first group of beams is represented by a vector or a matrix. Optionally, in such an example, or in another example, each beam in the codebook of beams is represented by a vector or a matrix. Optionally, in any one of the above mentioned examples, or in another example, the first number of bits is a number of bits before potential encoding. Optionally, in any one of the above mentioned examples, or in another example, a group index is determined by $C_1+l$, where $x_0, x_1, \ldots, x_{M-1}$ are M beam indices to be reported, $C_1$ is an arbitrary constant, and l is equal to $$l = \sum_{n=1}^{x_0} \binom{N-n}{M-1} + \sum_{i=0}^{M-3} \sum_{n=x_i+2}^{x_{i+1}} \binom{N-n}{M-2-i} + x_{M-1} - x_{M-2} - 1.$$

Optionally, in any one of the above mentioned examples, or in another example, a group index is determined by $C_2-l$, where $x_0, x_1, \ldots, x_{M-1}$ are M beam indices to be reported, $C_2$ is an arbitrary constant, and l is equal to $$l = \sum_{n=1}^{x_0} \binom{N-n}{M-1} + \sum_{i=0}^{M-3} \sum_{n=x_i+2}^{x_{i+1}} \binom{N-n}{M-2-i} + x_{M-1} - x_{M-2} - 1.$$

Optionally, in any one of the above mentioned examples, or in another example, the predefined sequence is specified in a standard text. Optionally, in any one of the above mentioned examples, or in another example, the method further includes receiving, by the UE, the predefined sequence in a signaling message. Optionally, in any one of the above mentioned examples, or in another example, the predefined sequence is an increasing sequential list of beam indices. Optionally, in any one of the above mentioned examples, or in another example, the predefined sequence is a decreasing sequential list of beam indices. Optionally, in any one of the above mentioned examples, or in another example, the first group of beams being adjacent to a second group of beams in response to the first group index being adjacent to a second group index, the first group of beams being mapped to the first group index, and the second group of beams being mapped to the second group index. Optionally, in any one of the above mentioned examples, or in another example, the first group of beams being adjacent to the second group of beams in response to a last beam index of the first group of beams being adjacent to a last beam index of the second group of beams and each of the other beam indices of the first group of beams being equal to a corresponding one of the other beam indices of the second group of beams. Optionally, in any one of the above mentioned examples, or in another example, the first group index being adjacent to the second group index in response to the first group index being in sequentially before or after the second group index. Optionally, in any one of the above mentioned examples, or in another example, a last beam index of the first group of beams being adjacent to a last beam index of the second group of beams in response to the last beam index of the first group of beams having an index greater or less than one of the last beam index of the second group of beams. Optionally, in any one of the above mentioned examples, or in another example, the first group of beams being greater than a second group of beams in response to the first group index being greater than a second group index, the first group of beams being mapped to a first group index, and the second group of beams being mapped to a second group index. Optionally, in any one of the above mentioned examples, or in another example, the second group of beams being greater than the first group of beams in response to an N-ary representation of the second group index having M beam indices being greater than the N-ary representation of the first group index, the N-ary representation being equal to $x_1 \times N^{(M-1)} + x_{(2)} \times N^{(M-2)} + \ldots + x_{(M-1)} \times N^{(1)} + x_{(M)} \times N^{(0)}$; and $x_y$ being a beam index corresponding to a yth beam index. Optionally, in any one of the above mentioned examples, or in another example, the first group of beams and the second group of beams are one of the group of beams. Optionally, in any one of the above mentioned examples, or in another example, the first group of beams being less than a second group of beams in response to a second group index being greater than the first group index, the first group of beams being mapped to a first group index, and the second group of beams being mapped to the second group index. Optionally, in any one of the above mentioned examples, or in another example, the second group of beams being less than the first group of beams in response to an N-ary representation of the second group index having M beam indices being less than the N-ary representation of the first group index, the N-ary representation being equal to $x_1 \times N^{(M-1)} + x_{(2)} \times N^{(M-2)} + \ldots + x_{(M-1)} \times N^{(1)} + x_{(M)} \times N^{(0)}$; and $x_y$ being a beam index corresponding to a yth beam index. Optionally, in any one of the above mentioned examples, or in another example, the first group of beams and the second group of beams are one of the group of beams. Optionally, in any one of the above mentioned examples, or in another example, the method further includes receiving, by the access node, a rotation index from the UE, the rotation index identifying a selected angle of rotation of a set of beams in the codebook of beams; and receiving, by the access node, a channel quality index (CQI) corresponding to the first group of beams.

In accordance with a first example embodiment of the present disclosure, a method for subspace selection is provided. The method includes selecting, by a user equipment (UE) from a number of N different beams that form a basis for a channel space, a first combination of beams that form a basis for a subspace of the channel space. The method also includes transmitting, by the UE to a base station, a descriptor of the first combination. The descriptor includes one of a linear combination index or a bitmap. The bitmap would include N bits each corresponding to a different beam of the N beams, where N is an integer greater than one.

In accordance with a second example embodiment of the present disclosure, a user equipment is provided. The user equipment includes a processor and a non-transitory computer-readable medium storing programming for execution by the processor. The programming includes instructions for selecting, from a number of N different beams that form a basis for a channel space, a first combination of beams that form a basis for a subspace of the channel space. The programming also includes instructions for transmitting, to a base station, a descriptor of the first combination. The descriptor includes one of a linear combination index or a bitmap. The bitmap would include N bits each corresponding to a different beam of the N beams, where N is an integer greater than one.

In accordance with a third example embodiment of the present disclosure, a base station is provided. The base station includes a processor and a non-transitory computer-readable medium storing programming for execution by the processor. The programming includes instructions for transmitting a reference signal to a user equipment (UE) over a communications channel corresponding to a channel space formed by a basis comprising N different beams. The programming also includes instructions for receiving, from the UE, a descriptor of a first combination of beams that form a basis for a subspace of the channel space. The descriptor includes one of a linear combination index or a bitmap. The bitmap would include N bits each corresponding to a different beam of the N beams.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a diagram of an embodiment wireless communications network;

FIG. 2 is a flow chart of an embodiment method for operating a user equipment (UE) and transmitting a linear combination index;

FIG. 3 is a flow chart of an embodiment method for operating a base station and receiving a linear combination index;

FIG. 4 is a flow chart of an embodiment method for operating a UE and transmitting CSI feedback;

FIG. 5 is a flow chart of an embodiment method for operating a base station and receiving CSI feedback;

DETAILED DESCRIPTION OF ILLUSTRATIVE EMBODIMENTS

Figure 6:
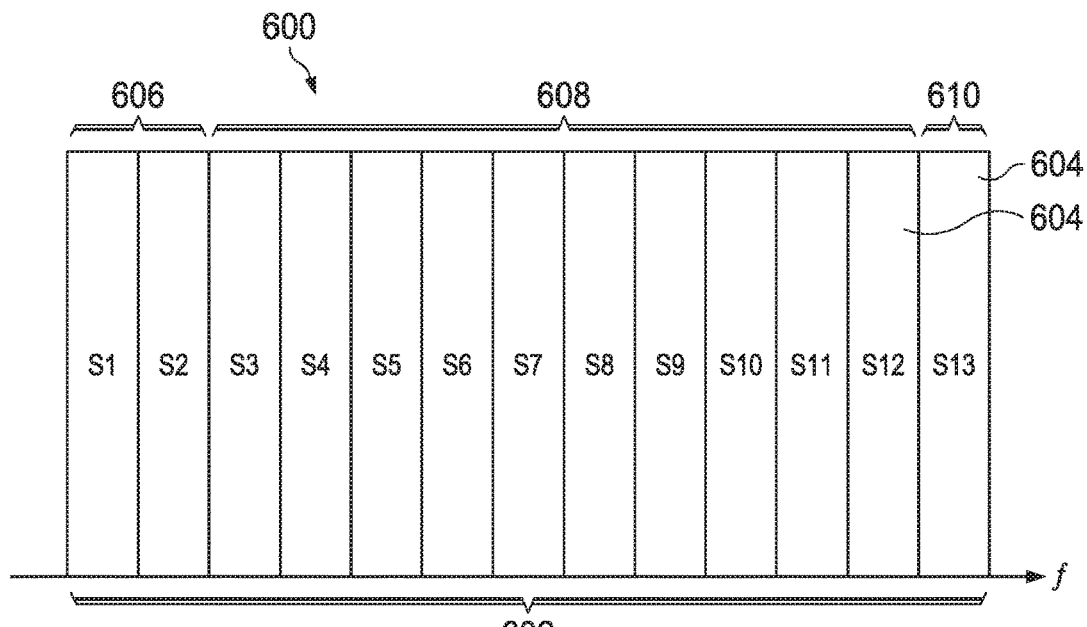
FIG. 6 is a diagram of a an embodiment sub-band bundling for channel weighting.

This disclosure provides many applicable inventive concepts that can be embodied in a wide variety of specific contexts. The specific embodiments discussed are merely illustrative of specific configurations and do not limit the scope of the disclosure. For example, although the disclosure will describe embodiments in the particular context of a downlink channel from a base station to a User Equipment (UE), the embodiments are equally applicable in an uplink from a multi-antenna UE to a base station or in any other over-the-air communications link originating from a device having multiple antennas. As used herein, the term "beam direction" refers to a radio antenna pattern, or set of beamforming weights, that is used for directional signal transmission and/or reception. The terms "beam directions" and "beams" are used interchangeably herein.

As mentioned above, implementing beamforming at both the UE and the base station may increase the complexity of beam management techniques, such as beam scanning and/or beam tracking. Beam scanning is generally performed during, or just prior to, link establishment in order to identify which pair of beam directions are to be used for initial data transmission/reception. Conventional beam scanning schemes generally require the UE to select a subset of beams based on reference signals received from the base station, and to subsequently feedback a corresponding list of beam indices to the base station. The subset of selected beams may then be used to schedule sounding reference signal (SRS) transmissions, which may be evaluated to develop a better estimate of the channel in order to select the appropriate pair of TX and RX beams for the initial data transmission.

Embodiments of this disclosure reduce the signaling overhead associated with beam scanning by feeding back a linear combination index that identifies the subset of select beams, rather than a list of indices identifying individual beams within the subset. Because the linear combination index identifies the selected "combination" of beams, the number of bits used to represent the linear combination index is generally less than the number of bits required to communicate a corresponding list of individual beam indices, thereby reducing signaling overhead. In some embodiments, the linear combination index belongs to a set of predefined linear combination indices, with each predefined linear combination index in the set identifying a different combination of available beams.

In an embodiment, a UE receives a reference signal (RS) from a base station in a downlink channel and calculates a channel estimation in accordance with the RS. The UE selects a combination of beams from a set of available beams in accordance with the calculated channel estimation. The UE transmits a linear combination index to the base station identifying the selected combination of beams. In an embodiment, the UE transmits a channel quality index (CQI) corresponding to the selected combination of beams to the base station. In this embodiment, the UE selects a rotation angle of a rotated channel space comprising the set of available beams. The UE then transmits a rotation index identifying the rotated channel space to the base station. The UE selects the rotation angle in accordance with the channel estimation.

In an embodiment, a base station transmits a RS to a UE in a downlink channel. In this embodiment, the base station receives a linear combination index from the UE, for example as CSI feedback. The linear combination index is used by the base station to identify a combination of beams selected by the UE from a set of available beams. The combination of beams that have been identified are used by the base station to communicate with the UE. In one embodiment, the linear combination index identifies the selected combination of beams without explicitly indicating or identifying the individual beams in the selected combination of beams. In another example, the linear combination index belongs to a set of predefined linear combination indices. In this example, each predefined linear combination index in the set of predefined linear combination indices identifies a different combination of beams in the set of available beams. In yet another example, the RS is transmitted over different beams in the set of beams in the downlink channel. In yet another embodiment, the base station receives a rotation index from the UE. In this embodiment, the rotation index identifies a rotation angle of a rotated channel space comprising the set of available beams selected by the UE. In an embodiment, the base station receives a CQI corresponding to the selected combination of beams from the UE. In some embodiments, each beam in a linear combination index is represented by a vector. In some other embodiments, each beam in the linear combination index is represented by a bit matrix.

In an embodiment, the UE may receive a RS transmitted from 32 ports of a base station in a DFT codebook scenario, resulting in a full-space basis of 16 beams due to polarization. The UE may then feedback beam indices for each of 4 selected beams, where each of these beam indices must include at least 4 bits since there are 16 total beams. The total bits required to feed back the subspace descriptor would be 4×4=16 bits. If such a system is only designed for no more than 16-bit feedback of the subspace descriptor, then no more than 4 beams may ever be selected by the UE when using an individual beam index feedback scheme. Alternatively, if a 16-bit bitmap is used as the subspace descriptor, the UE may vary the number of selected beams from 1 to 16 based on local conditions without requiring extra signaling.

Advantageously, a linear combination index used as the subspace descriptor may reduce overhead relative to feeding back all selected beam indices. As an example, when the UE is to select 4 beams out of a channel space fully represented by 16 beams, then $$\binom{16}{4} = \frac{16!}{4!(16-4)!} = 1820$$

different combinations are possible. Accordingly, the linear combination index may be represented by as few as $\lceil \log_2 1820 \rceil = 11$ bits. Thus, such a linear combination index could reduce overhead compared to feeding back all 4 selected beam indices, which as previously discussed would require at least 16 bits.

The number of bits representing each group of beams in a linear combination index of beam may be calculated using the equation: $\text{ceiling}(\log_2(\binom{N}{M}))$. In this equation, the least integer of logarithm (base 2) of the binomial coefficient $\binom{N}{M}$ represents the number of bits of a group. The binomial coefficient $\binom{N}{M}$ can be calculated using the formula:

$$\left(\frac{N!}{M!(N-M)!}\right).$$

In such an embodiment, N represents a number of codewords in a codebook of beams and M is a number of beams in a group of beams.

FIG. 1 illustrates a network 100 for communicating data. The network 100 comprises a base station 110 having a coverage area 101, a plurality of UEs 115, and a backhaul network 130. As shown, the base station 110 establishes uplink (dashed line) and/or downlink (dotted line) connections with the UEs 115, which serve to carry data from the UEs 115 to the base station 110 and vice-versa. Data carried over the uplink/downlink connections may include data communicated between the UEs 115, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

FIG. 2 is a flowchart of an embodiment method 200 for receiving a RS and transmitting a selected group of beams to a base station, as may be performed by a UE. At step 202, the UE receives the RS from the base station in a downlink channel. In one embodiment, the RS may be received by the UE over receive beams from the base station. In another embodiment, the RS may be received without beamforming, such as in non-precoded channel state information-reference signal (CSI-RS) of an LTE network. In yet another embodiment, the RS may be beamformed in the downlink channel, but the UE may receive the RS without receiving the beamforming, such as in multiple input, multiple output (MIMO) class B of an LTE network.

At step 204, the UE calculates a channel estimation of the downlink channel in accordance with the RS. At step 206, in a subspace of a channel space between the UE and the base station, where the channel space has a basis formed by a set of available beams, the UE selects a combination of beams that form a basis for the subspace. The combination of beams selected by the UE is in accordance with the channel estimation calculated at step 204. At step 208, the UE determines from a set of predefined linear combination indices, a linear combination index identifying the selected combination of beams. In the set of predefined linear combination indices, each predefined linear combination index identifies a different combination of beams of the set of available beams. The linear combination index identifies the selected combination of beams without identifying, or explicitly indicating each individual beam in the selected combination of beams. At step 210, the UE transmits the linear combination index to the base station.

FIG. 3 is a flowchart of an embodiment method 300 for transmitting a RS and receiving a selected group of beams from a UE, as may be performed by a base station. At step 302, the base station transmits a RS to the UE in a downlink channel. As previously stated, with respect to FIG. 2, in some embodiments, the RS may be transmitted over beams and in other embodiments, the RS may be transmitted to the UE without beamforming. At step 304, the base station receives a linear combination index from the UE in response to the transmitted RS. At step 306, the base station identifies a group of beams in a channel space that form a basis for a subspace that the UE has selected. At step 308, the base station may use a same set of predefined linear combination indices to identify the group of beams. The base station then uses this group of beams to communicate with the UE.

FIG. 4 is a flowchart of an embodiment method 400 for receiving a RS and transmitting a selected group of beams to a base station as CSI feedback, as may be performed by a UE. At step 402, the UE receives the RS from the base station in a downlink channel. As previously stated, with respect to FIG. 2, in some embodiments, the RS may be received over beams and in other embodiments, the RS may be received without beamforming.

At step 404, the UE calculates a channel estimation of the downlink channel in accordance with the RS. In some embodiments, the UE may also perform a channel estimation over a channel space that the UE models as having, for example, an orthogonal basis of N different beams. In an embodiment, this channel space model may also be rotated P number of times when calculating the channel estimation.

In an embodiment, the channel space model may be rotated P number of times to support P times oversampling in the spatial domain. The rotation is used to better align the channel space model with the optimal channel path. A codebook used for this channel estimation may be, for example, a codebook based on a Discrete Fourier Transform (DFT) such as the DFT-based codebook used by LTE Release 13.

In large scale MIMO environments, where a large number of base stations and UEs utilize MIMO techniques, channel statistics such as channel correlation or channel covariance matrix (CCM) are typically used to determine the channel state information (CSI). The CCM may be utilized to estimate the high-dimensional channels and/or convert the high-dimensional channels into low-dimensional subspaces, which reduces the effective channel dimensions. At step 406, the UE derives a downlink channel covariance matrix (DCCM) based on the channel space model of the full space basis. At step 408, the UE selects one or more eigenvectors of the covariance matrix. At step 410, in a subspace of the channel space, where the channel space has a basis formed by a set of available beams, the UE selects a subspace. The combination of beams selected by the UE is in accordance with at least the principal eigenvector of the covariance matrix determined in step 406. Increasing numbers of eigenvectors may be used for the subspace selection as the rank of the channel covariance matrix increases.

In an embodiment with oversampling where the basis of the channel subspace may have a non-orthogonal basis, the UE may also select one of the P rotation angles of the rotated channel space. The channel subspace has a basis of M different beams selected from the N total beams, where M is less than or equal to N. The UE maps the eigenvector(s) onto the selected M-beam subspace to calculate M channel weight(s). The channel weight(s) may include both quantized phase and amplitude coefficients that are to be used by the base station to precode transmissions over a particular frequency band. When a frequency band is divided into sub-bands, various channel weighting protocols may be used to provide increased or decreased granularity of channel weights over the different sub-bands. In an exemplary channel weighting protocol, the UE feeds back different phase and amplitude coefficient(s) for each respective sub-band. This protocol may result in improved channel quality at the expense of high feedback overhead. For example, when a 20 MHz band is divided into 13 sub-bands, and 3 bit phase coefficients and 3 bit amplitude coefficients are used for each sub-band, then 13×(3+3)=78 bits are used for the channel weight feedback.

At step 412, the UE determines from a set of predefined linear combination indices, a linear combination index identifying the subspace. In the set of predefined linear combination indices, each predefined linear combination index identifies a subspace of the full space basis. The linear combination index identifies the subspace without identifying, or explicitly indicating each individual beam in the subspace. At step 414, the UE determines a channel quality index (CQI) of the subspace corresponding to each set of channel weights.

In embodiments with oversampling, a rotation index is selected that describes the selected rotation angle. At step 416, the UE determines a rotation index that corresponds to the selected rotation angle of a rotated space comprising the full space basis. As an example, a 3 bit rotation index can indicate up to 8 different rotation angles to support 8 times oversampling in the spatial domain.

At step 418, the UE transmits a CSI feedback to the base station comprising the linear combination index, the channel quality index (CQI), and the rotation angle of the rotated space.

FIG. 5 is a flowchart of an embodiment method 500 for transmitting a RS and receiving a CSI feedback from a UE, as may be performed by a base station. At step 502, the base station transmits a RS to the UE in a downlink channel. As previously stated, with respect to FIG. 2, in some embodiments, the RS may be transmitted over beams and in other embodiments, the RS may be transmitted to the UE without beamforming. the base station transmits a reference signal to a UE. At step 504, the base station receives, from the UE, a CSI feedback. The CSI feedback may comprise a linear combination index, a rotation index, and weighting factors and an associated channel quality index. At step 506, the base station may use the linear combination index in the CSI feedback to identify a combination of beams that form a basis for a subspace of a channel space. The channel subspace selected from a channel space identified by the UE. At step 508, the base station uses the channel quality index to identify the channel quality index of the selected combination of beams identified using the linear combination index. At step 510, the base station may use the rotation index to identify a selected rotation angle in a channel space model rotated to support oversampling in the spatial domain. The base station uses the information from the CSI feedback and at least one of the channel subspace, rotation angle, weighting factors and channel quality index to communicate with the UE.

In some embodiments, the descriptor of the selected combination of beams may be an N-bit bitmap. In this bitmap, each bit corresponds to a selection of a beam; if a particular bit element in the bitmap is set to one, this value indicates that a corresponding beam is selected, while a zero valued bit indicates that the corresponding beam is not selected. In other embodiments, the reverse of this logic may be used.

Relative to feeding back the individual indices of all selected beams, a bitmap used as the subspace descriptor may increase system flexibility by allowing the number of selected beams to vary. Allowing the number of selected beams to vary may achieve a better performance-overhead tradeoff. In some deployment scenarios, for example, under line-of-sight conditions a UE would only need to feedback one selected path from the base station to the UE. In other deployments, however, a path cluster covering a wider angle spread may be required to effectively represent the communications channel. To cover this wider angle spread, several beams may need to be selected as a basis for the channel subspace. If the indices of all selected beams are fed back, however, the number of feedback bits required increases as the number of selected beams increases.

FIG. 6 illustrates an embodiment of a band 600 subdivided into sub-bands 604 in which the exemplary channel weighting protocol previously described is modified to allow for sub-band bundling. The sub-bands 604 within a particular frequency range may be grouped together into bundles that may differ in bandwidth. The UE may then calculate different phase and amplitude coefficients for each bundle 604. In the embodiment of FIG. 6, a frequency range 602 may be, for example, 20 MHz wide. This frequency range 602 is divided into 13 sub-bands 604 which are labeled S1 through S13. S1 and S2 are grouped together as a first sub-band bundle 606, S3 through S12 are grouped together as a second sub-band bundle 608, and S13 is a third sub-band bundle 610. The CSI feedback may then include 3 amplitude bits and 3 phase bits for each of these three bundles, resulting in (3+3)×3=18 channel weight bits. In an embodiment, the base station may direct the sub-band bundling based on channel conditions to provide a performance-overhead tradeoff. For example, the base station could bundle sub-bands at a granularity sufficient to provide the minimum number of feedback bits to achieve a predetermined performance level.

Figure 7:
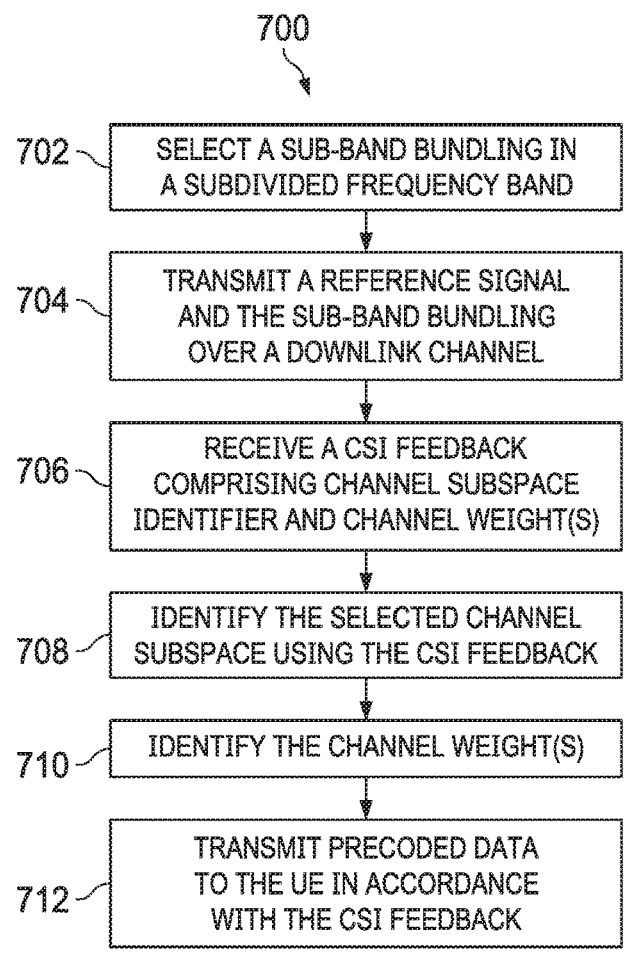
FIG. 7 is a flow chart of another embodiment method for operating a base station and receiving CSI feedback.

FIG. 7 is a flowchart of an embodiment method 700 for transmitting a RS and a descriptor of a sub-band bundling to a UE and receiving CSI feedback, as may be performed by a base station. At step 702, the base station selects a sub-band bundling in a frequency band that is divided into sub-bands based on a channel condition. Each sub-band may be bundled as part of a sub-band bundle, as previously described with respect to FIG. 6. At step 704, the base station transmits a descriptor of the sub-band bundling along with a RS in a downlink channel to a UE. In an embodiment, the RS may be an LTE non-precoded CSI-RS. In another embodiment, the RS may be in a MIMO class B LTE network. In some embodiments, the sub-band bundling descriptor may be included in a transmission that is different and distinct from the reference signal. At step 706, the base station receives CSI feedback transmitted from the UE. This CSI feedback indicates both a subspace selected by the UE, and channel weight(s) calculated by the UE in accordance with the selected sub-band bundling. The channel subspace selected by the UE has a basis of M different beams selected from N total beams of the entire channel space, where M is less than or equal to N. In embodiments where spatial oversampling is used by the UE, the CSI feedback may also include a rotation index that describes which of P rotation angles has been selected. The descriptor of the selected subspace that is included in the CSI may be either an N-bit bitmap or a linear combination index.

At step 708, the base station identifies the selected channel subspace using the CSI feedback. The base station may use the linear combination index in the CSI feedback to identify a combination of beams that form a basis for a subspace of a channel space. The channel subspace is selected from a channel space identified by the UE. At step 710, the base station identifies channel weight(s) in accordance with the CSI feedback. In addition to the channel weighting protocols already described, other channel weighting protocols may also be used. In another exemplary protocol, the same amplitude coefficient(s) are to be used over the entire frequency band but different phase coefficient(s) are to be used over different sub-bands, which may decrease channel quality while saving overhead. For example, a 20 MHz band may have a 3 bit amplitude coefficient and may be divided into 13 sub-bands each having 3 bit phase coefficients, resulting in (13×3)+3=42 channel weight bits and an approximate 6% performance loss relative to using all 78 channel weight bits. In yet another exemplary protocol, a differential amplitude for each respective sub-band may be used in conjunction with an amplitude for the entire frequency range, while different phase coefficients are still used for each respective sub-band. For example, 2 wideband amplitude bits, 1 differential amplitude bits per sub-band, and 3 phase bits per sub-band may be used. Over 13 sub-bands, this example would result in feedback of 13×(1+3)+2=54 channel weight bits.

At step 712, the base station transmits precoded data to the UE in accordance with the M selected beams and the channel weight(s) identified.

In an embodiment where the descriptor of the combination of beams is a linear combination index, the UE selects a number of M beams from N available set of beams (M is less than or equal to N). In this embodiment, an M-by-1 index vector x may be formed. This index vector x includes M elements that each include a respective index of a different one of the M selected beams. The N beams are sorted according to certain order and the beam order is commonly known to base station and UE. The beam order of M selected beams in x follows the same order. A linear function may then uniquely map all possible values of index vector x to a unique scalar $l$ in $\mathbb{R}^1$. In other words, the linear combination index $l=a_0x_0+a_1x_1+ \ldots +a_{M-1}x_{M-1}$, where $a_0$, $a_1, \ldots, a_{M-1}$, are scalars with values that provide a unique mapping to $\mathbb{R}^1$.

For example, when N is equal to 16 and M is equal to 4, the UE can compute the linear combination index by using Equation 1 below:

$$l = \sum_{n=1}^{x_0} \binom{16-n}{3} + \sum_{n=x_0+2}^{x_1} \binom{16-n}{2} + \sum_{n=x_1+2}^{x_2} \binom{16-n}{1} + x_3 - x_2 - 1 \quad \text{(Eq. 1)}$$

More generally, for an arbitrary number of M beams selected from N total beams, a linear combination index can be computed using Equation 2 below:

$$l = \sum_{n=1}^{x_0} \binom{N-n}{M-1} + \sum_{i=0}^{M-3} \sum_{n=x_i+2}^{x_{i+1}} \binom{N-n}{M-2-i} + x_{M-1} - x_{M-2} - 1 \quad \text{(Eq. 2)}$$

In another embodiment, where the beam reporting index is indexed as $i_{1,2}=[n_1 \ n_2]$, $n_1=[n_1^{(0)}, \ldots, n_1^{(L-1)}]$, $n_2=[n_2^{(0)}, \ldots, n_2^{(L-1)}]$ where $n_1^{(i)} \in \{0, 1, \ldots, N_1-1\}$, $n_2^{(i)} \in \{0, 1, \ldots, N_2-1\}$, the combinatorial numbering can be computed using the Equation 3 below:

$$i_{1,2} = \sum_{i=0}^{L-1} \binom{N_1 N_2 - 1 - n^{(i)}}{L-1} \quad \text{(Eq. 3)}$$

The indices $i_{1,2}$ is reported using a combinatorial coefficient table where for a given L and $(N_1, N_2)$, rows $0, \ldots, N_1 N_2 - 1$, and cols $1, \ldots, L$ are used.

In the $[n_1, n_2]$ to $i_{1,2}$ mapping, beam sorting may be identified as $n^{(i)} = N_1 n_2^{(i)} + n_1^{(i)}$ (indices i is assigned such that $n^{(i)}$ increases as i increases). As a result the indices $i_{1,2} = \Sigma_{i=0}^{L-1} C(N_1 N_2 - 1 - n^{(i)}, L-i)$, where $C(x,y)$ is a the set of combinatorial coefficients.

In the $i_{1,2}$ to $[n_1, n_2]$ mapping, for $i=0, \ldots, L-1$, $e_i = C(x^*, L-i)$ is obtained using $i_{1,2}$ and the combinatorial coefficient table.

$$n^{(i)} = N_1 N_2 - 1 - x^*$$

$$n_1^{(i)} = n^{(i)} \bmod N_1, \, n_2^{(i)} = \frac{n^{(i)}}{N_1}$$

While iterating over $i=0, 1, \ldots, L-1$, where $s_1=0$, the largest $x^* \epsilon \{L-1-i, \ldots, N_1 N_2 - 1 - i\}$ s. t. $i_{1,2} - s_{i-1} \geq C(x^*, L-i)$ is used to calculate $e_i = C(x^*, L-i)$, $s_i = s_{i-1} + e_i$.

It is worth noting that Eq. 2 is equivalent to Eq. 3. Assuming $N = N_1 N_2$ and $n = n^{(i)}$, Eq. 2=C(N,M)-Eq. 3.

The beam indices in the predefined linear combination of indices may have a predefined sequence or order. In an embodiment, the predefined sequence of beams may have an ascending order. In this embodiment, each beam in the linear combination has a sequentially ascending number, with the first beam index being less than the last beam index. In an alternative embodiment, the predefined sequence of beams may have a descending order. In such an embodiment, each beam in the linear combination has a sequentially descending order, with the first beam index being greater than the last beam index. In an embodiment, the sequential order may be specified in a standard text. In another embodiment, the predefined sequence of the predefined linear combination of indices may be signaled, using a signaling message, to the UE from a base station.

A group of beams in the linear combination of index may be said to be adjacent to each other when the corresponding group index is adjacent to each other. The group of beams may also be said to be adjacent to each other when the last beam index of each group of beams is adjacent to each other and all other indices of the groups are matched. In such an embodiment, the last beam index of adjacent groups are separated by a single index.

In an embodiment, the index of each group of beams is directly correlated to its corresponding group of beams. As an example, a group of beams having an index larger than a second group of beams also has a larger group of beams. The opposite also holds true.

A groups size can be determined by the N-ary representation of the group. The N-ary representation being equal to $x_1 \times N^{(M-1)} + x_{(2)} \times N^{(M-2)} + \ldots + x_{(M-1)} \times N^{(1)} + x_{(M)} \times N^{(0)}$. In this equation, $x_y$ represents the yth beam index of a group of beams having M beam indices.

Figure 8:
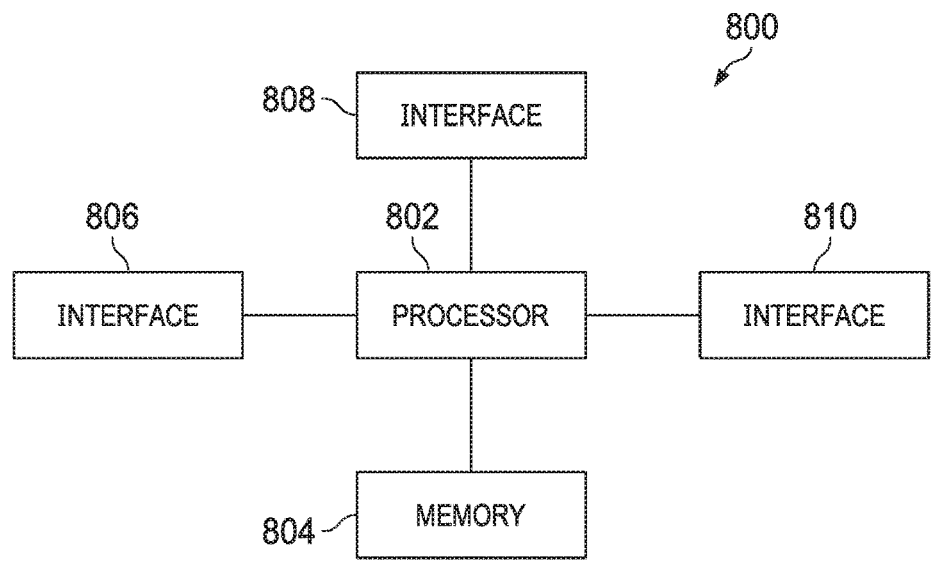
FIG. 8 is a diagram of an embodiment processing system.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
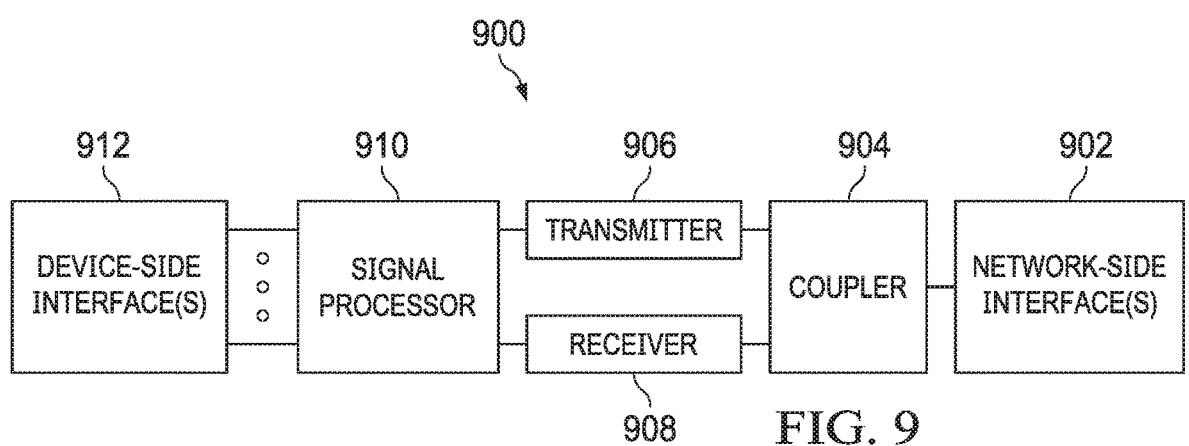
FIG. 9 is a diagram of an embodiment transceiver.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. A signal may be selected by a selecting unit or a storing module. The respective units/modules may be hardware, software, or a combination thereof. For instance, one or more of the units/modules may be an integrated circuit, such as FPGAs or ASICs.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Illustrative embodiments have the advantage of using CSI feedback in a communications network to provide increased channel resolution for improved precoding and/or multi-user scheduling. Relative to codebook feedback or beam index feedback, embodiments provide the advantages of reducing overhead and/or improving beam selection flexibility while still maintaining communications performance.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for sending a channel state information, comprising:

receiving, by a user equipment (UE), one or more reference signals; and transmitting, by the UE, a first group index to a base station, the first group index including bits identifying a first group of beams selected from a codebook of beams, a number of bits in the first group index being equal to ceiling $(\log_2(_M^N))$, where N is a number of beams in the codebook of beams and M is a number of beams in the first group of beams, and the first group index set in accordance with $$\sum_{n=1}^{x_0}\binom{N-n}{M-1}+\left[\sum_{i=0}^{M-3}\sum_{n=x_{(i)}+2}^{x_{(i+1)}}\binom{N-n}{M-2-i}\right]+x_{M-1}-x_{M-2}-1$$

where $x_0, x_1, \ldots, x_{M-1}$ are M beam indices being identified by the first group index.

2. The method of claim 1, wherein each beam in the first group of beams is represented by a vector.

3. The method of claim 1, wherein each beam in the codebook of beams is represented by a vector.

4. The method of claim 1, wherein the number of bits is a number of bits before potential encoding.

5. The method of claim 1, wherein the method further comprises selecting, by the UE, a first group of beams from a codebook of beams based on the one or more reference signals, the first group of beams having a predefined sequence, the predefined sequence being specified in a standard text.

6. The method of claim 5, wherein the method further comprises receiving, by the UE, the predefined sequence in a signaling message.

7. The method of claim 5, wherein the predefined sequence is an increasing sequential list of beam indices.

8. The method of claim 1, wherein the first group index is determined such that the first group of beams is adjacent to a second group of beams when the first group index is adjacent to a second group index, the first group of beams being mapped to the first group index, and the second group of beams being mapped to the second group index.

9. The method of claim 8, wherein the first group index is determined such that the first group of beams is adjacent to the second group of beams when a last beam index of the first group of beams is adjacent to a last beam index of the second group of beams and each of the other beam indices of the first group of beams is equal to a corresponding one of the other beam indices of the second group of beams.

10. The method of claim 8, wherein the first group index is determined such that the first group index is adjacent to the second group index when the first group index is sequentially before or after the second group index.

11. The method of claim 1, further comprising:

transmitting, by the UE, a rotation index to the base station, the rotation index identifying a selected angle of rotation of a channel space comprising a set of beams in a group of beams; and transmitting, by the UE, a channel quality index (CQI) corresponding to selected weighted combination of beams.

12. The method of claim 1, further comprising:

calculating, by the UE, a channel estimation of a downlink channel in accordance with a reference signal (RS), a combination of beams selected in accordance with the channel estimation;

selecting, by the UE, a rotation index in accordance with the channel estimation; and transmitting, by the UE, the selected rotation index to the base station.

13. The method of claim 1, further comprising setting the first group index in accordance with C2-l, where $x_0, x_1, \ldots, x_{M-1}$ are M beam indices to be reported, C2 is a constant, and l is equal to $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1.$$

14. A method for receiving channel state information, comprising:

receiving, by a base station, a first group index from a user equipment (UE), the first group index including bits identifying a first group of beams selected from a codebook of beams, a number of bits in the first group index being equal to ceiling ($\log_2(_M^N)$), where N is a number of beams in the codebook of beams and M is a number of beams in the first group of beams, and the first group index set in accordance with $$\sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

where $x_0, x_1, \ldots, x_{M-1}$ are M beam indices being identified by the first group index; and communicating, by the base station, a signal with the UE in accordance with one or more beams from the first group of beams identified by the first group index.

15. The method of claim 14, wherein each beam in the first group of beams is represented by a vector.

16. The method of claim 14, wherein each beam in the codebook of beams is represented by a vector.

17. The method of claim 14, wherein the number of bits is a number of bits before potential encoding.

18. The method of claim 14, wherein the method further comprises mapping, by the base station, the received first group index to the first group of beams selected from the codebook of beams, and identified by the M beam indices, the first group of beams having a predefined sequence being specified in a standard text.

19. The method of claim 18, wherein the method further comprises transmitting, by the base station, the predefined sequence in a signaling message to the UE.

20. The method of claim 18, wherein the predefined sequence is an increasing sequential list of beam indices.

21. The method of claim 14, wherein the first group index is determined such that the first group of beams is adjacent to a second group of beams when the first group index is adjacent to a second group index, the first group of beams being mapped to the first group index, and the second group of beams being mapped to the second group index.

22. The method of claim 21, wherein the first group index is determined such that the first group of beams is adjacent to the second group of beams when a last beam index of the first group of beams is adjacent to a last beam index of the second group of beams and each of the other beam indices of the first group of beams is equal to a corresponding one of the other beam indices of the second group of beams.

23. The method of claim 21, wherein the first group index is determined such that the first group index is adjacent to the second group index when the first group index is sequentially before or after the second group index.

24. The method of claim 14, further comprising:

receiving, by the base station, a rotation index from the UE, the rotation index identifying a selected angle of rotation of a set of beams in the codebook of beams; and receiving, by the base station, a channel quality index (CQI) corresponding to the first group of beams.

25. The method of claim 14, wherein the first group index is set in accordance with C2-l, where $x_0, x_1, \ldots, x_{M-1}$ are M beam indices to be reported, C2 is a constant, and l is equal to $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1.$$

26. A method for receiving a channel state information, comprising:

transmitting, by a base station, one or more reference signals to a user equipment (UE);

receiving, by the base station, a first group index from the UE, the first group index identifying a first group of beams based on the first group of beams, a number of beams in a codebook of beams (N), and a number of beams in the first group of beams (M), a number of bits used to indicate the first group index being equal to ceiling ($\log_2(_M^N)$);

identifying, by the base station, from the received first group index, the beams in the first group of beams, wherein the beams in the first group of beams are identified in accordance with $$\sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

where $x_0, x_1, \ldots, x_{M-1}$ are M beam indices corresponding to the first group of beams; and communicating, by the base station, a signal with the UE in accordance with one or more beams based on the identified beams in the first group of beams.

27. The method of claim 26, wherein each beam in the first group of beams is represented by a vector.

28. The method of claim 26, wherein the beams in the first group of beams are identified in accordance with C2-l, where $x_0, x_1, \ldots, x_{M-1}$ are M beam indices to be reported, C2 is a constant, and l is equal to $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1.$$

29. A base station comprising:

a non-transitory memory storage comprising instructions; and a processor in communication with the non-transitory memory storage, wherein the processor executes the instructions to:

transmit one or more reference signals to a user equipment (UE);

receive a first group index from the UE, the first group index identifying a first group of beams based on the first group of beams, a number of beams in a codebook of beams (N), and a number of beams in the first group of beams (M), a number of bits used to indicate the first group index being equal to ceiling($\log_2(\binom{N}{M})$);

identify from the received first group index, the beams in the first group of beams wherein the beams in the first group of beams are identified in accordance with $$\sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

where $x_0, x_1, \ldots, x_{M-1}$ are M beam indices corresponding to the first group of beams; and communicate a signal with the UE in accordance with one or more beams based on the identified beams in the first group of beams.

30. The base station of claim 29, wherein each beam in the first group of beams is represented by a vector.

31. The base station of claim 29, wherein the beams in the first group of beams are identified in accordance with C2-l, where $x_0, x_1, \ldots, x_{M-1}$ are M beam indices to be reported, C2 is a constant, and l is equal to $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1.$$

* * * * *

UNITED STATES PATENT AND TRADEMARK OFFICE
CERTIFICATE OF CORRECTION

PATENT NO. : 11,082,176 B2
APPLICATION NO. : 15/800955
DATED : August 3, 2021
INVENTOR(S) : Liu It is certified that error appears in the above-identified patent and that said Letters Patent is hereby corrected as shown below:

In the Claims

Claim 1, Column 18, Line 7; delete "ceiling" and insert --*ceiling*--.

Claim 1, Column 18, Line 15-17; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 13, Column 19, Lines 6-7; delete "1" and insert --*l*--.

Claim 13, Column 19, Lines 10-15; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 14, Column 19, Lines 10-15; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 14, Column 19, Line 22; delete "ceiling" and insert --*ceiling*--.

Claim 25, Column 20, Lines 13-14; delete "1" and insert --*l*--.

Claim 25, Column 20, Lines 20-23; delete formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Signed and Sealed this
Fifth Day of October, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,082,176 B2

Claim 26, Column 20, Line 34; delete "ceiling" and insert --*ceiling*--.

Claim 26, Column 20, Lines 40-45; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 28, Column 20, Lines 55-57; delete "1" and insert --*l*--.

Claim 28, Column 20, Lines 60-64; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 29, Column 21, Line 10; delete "ceiling" and insert --*ceiling*--.

Claim 29, Column 21, Line 15; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$

Claim 31, Column 22, Lines 9-11; delete "1" and insert --*l*--.

Claim 31, Column 22, Line 15; delete the formula and insert $$l = \sum_{n=1}^{x_0} \binom{N-n}{M-1} + \left[\sum_{i=0}^{M-3} \sum_{n=x_{(i)}+2}^{x_{(i+1)}} \binom{N-n}{M-2-i}\right] + x_{M-1} - x_{M-2} - 1$$